Feb. 27, 1923. 1,446,469.
A. W. LIMONT.
METHOD OF MAKING VALVE STEMS.
FILED AUG. 23, 1921.
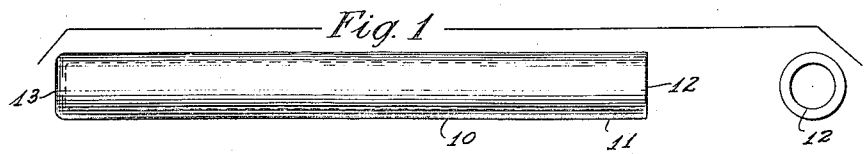
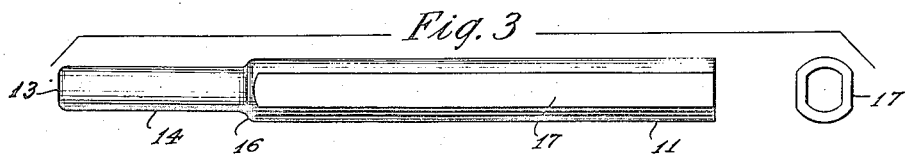
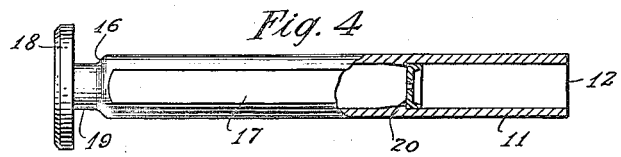
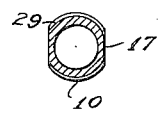
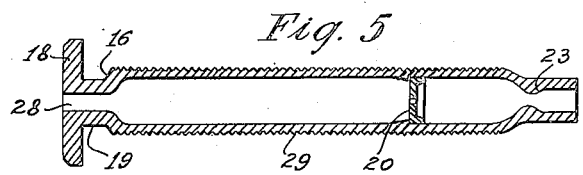
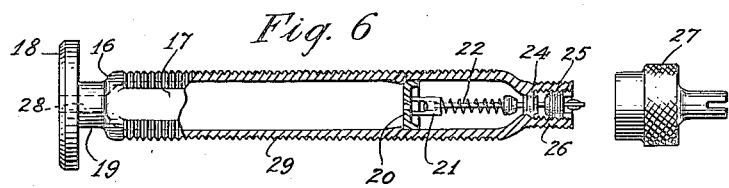
INVENTOR.
Alexander W. Limont
BY
Chamberlain & Newman ATTORNEYS.

Patented Feb. 27, 1923.

1,446,469

UNITED STATES PATENT OFFICE.

ALEXANDER W. LIMONT, OF BRIDGEPORT, CONNECTICUT.

METHOD OF MAKING VALVE STEMS.

Application filed August 23, 1921. Serial No. 494,520.

*To all whom it may concern:*

Be it known that ALEXANDER W. LIMONT, citizen of the United States, and resident of Bridgeport, in the county of Fairfield and State of Connecticut, has invented certain new and useful Improvements in Methods of Making Valve Stems, of which the following is a specification.

My present invention refers to an improved method of manufacturing pneumatic tire valve-stems, bodies or casings, as they are sometimes called and it especially relates to a method of producing such stems from drawn sheet metal shells.

The purpose of the invention is to lessen the cost of manufacturing valve-stems of this class, by materially reducing the amount of scrap produced in manufacturing, and by reducing the amount of stock required from which to form such a valve-stem and particularly to produce a lighter and stronger valve-stem at less cost.

Further to employ a series of operations which may be uniformally and accurately followed by automatic machinery whereby the essential structural features of standard makes and sizes of valve-stems may be produced, and whereby the required structural features of valve-stems of this character, made necessary to permit of the interchangeability of such parts are provided for. Further to include a method of forming valve-stems from shells, having an elongated cylindrical side wall open at one end and closed at the other, whereby not only the required form of opening through the stem may be produced, but to form a head of the closed end of the shell, and to include flat side portions on the body by means other than milling, as is now customary.

With these and other minor objects in view the invention resides and consists in the novel method of forming an article of manufacture of the above character as will be later more specifically described in the specification and set out in the claims hereto annexed.

Upon the accompanying drawings forming a part of this specification similar characters of reference will be seen to denote like or corresponding parts throughout the several figures and of which :—

Fig. 1 shows a side elevation and an end view respectively, of a relatively long form of shell such as may be readily drawn from metal.

Fig. 2 illustrates the same shell after the closed end portion has been operated upon to reduce and lengthen the shell.

Fig. 3 shows a further side view and an end view respectively, of the shell illustrating the result of the second operation whereby the flat sides are formed.

Fig. 4 is a sectional side elevation of the shell showing, the further operation of forming the head.

Fig. 5 is a longitudinal sectional view of the shell showing two further steps in my improved method namely that of reducing the open end portion of the shell and threading the cylindrical surface of the body portion.

Fig. 6 shows a sectional side view of a complete valve-stem formed in accordance with my improved method and illustrating a removable check valve positioned therein and, Fig. 7 shows a cross section of the shell, illustrating a modification.

The illustrations just referred to are designed to represent the preferred method of operations employed in the production of a valve-stem of this type but it will be obvious that slight variations may be resorted to if necessary, the essential features of the invention being the production of a commercial type of valve-stem from a drawn shell, by a series of operations which include the reduction of certain portions of the cylindrical body of the shell whereby the same is elongated and shaped and adapted to be threaded; and in the further features of forming the head of the bottom end portion of the shell, said head being of a double thickness of stock and of a diameter greater than that of the diameter of the body of the finished stem.

In the drawings 10 represents an elongated shell including a cylindrical body portion 11 of substantially uniform thickness and diameter said shell being open at one end 12 and closed upon the other end 13 as is commonly the case with shells formed of sheet stock by a series of drawing operations. This shell thus constitutes the blank from which the valve-stem is formed and according to my improved method is first operated upon in a way to reduce the closed end portion 14 of the shell leaving the remainder of the body portion unchanged. As indicated, this operation reduces the size, of that portion of the longitudinal hole or pocket 15 within the reduced portion of the shell and also forms an annular shoulder 16 thereon.

While it is not material as to the exact order of all the operations, yet as illustrated in the drawings I prefer to next form the opposite flat side portions 17 by forming operation so as to preferably leave the shell in the shape indicated in end view, in Fig. 3 having its wall throughout of uniform thickness. The shell may next be placed in suitable dies and the closed end portion operated upon to form the flat head 18 as shown in Fig. 4 in a way to retain the diameter and complete the shape of the neck portion 19, as shown in Figs. 4, 5 and 6.

If the valve-stem is to be fitted with the common commercial type of valve shown in Fig. 6, I may employ an internal support 20 as shown in Figs. 4, 5 and 6 having holes therethrough, and position it inside of the shell prior to the operation of closing the open end portion, so that it will form a proper support for the shoe 21 in which the valve-stem 22 is slidably mounted as indicated in Fig. 6. This shoe may be held in position in any preferred way as for instance by being forced into the shell against a shoulder prior to the closing operation, as shown in Fig. 4.

After I reduce the open end portion of the shell I preferably form an inner annular shoulder 23 which is employed as a valve seat against which the valve 24 is positioned to close the stem. This valve seat is formed by a drilling and reaming operation. This end portion of the stem is next tapped to receive the nut 25 that supports the valve stem and valve in the respective operative positions. This valve and its attached parts may thus be positioned in the chamber of the stem in a manner to allow air to be forced therethrough and so as to check and hold the same from escaping. A thread 26 is also cut on the surface of the end to accommodate an inclosure cap 27. The opposite or head end of the shell is next reamed out to form the hole 28 which serves to complete the passage through the valve-stem so as to allow air to readily pass therethrough. The thread 29 upon the cylindrical peripheral surface of the body of the stem may be next formed to complete the formation of the valve-stem, said thread as is customary in valve-stem designs of this sort, being employed to accommodate nuts, not shown, that engage a wheel rim and clamp the valve-stem in position therein.

The cross sectional view of the valve-stem shown in Fig. 7 illustrates a modification which in this construction shows a circular passage and flat sides which latter may be milled or otherwise formed.

Having thus described my invention, what I claim and desire to secure by Letters Patent is:—

1. The herein described method of forming valve-stems from sheet metal shells which consists in reducing the diameter and elongating a portion of the shell, forming a head on one end portion of the shell, forming opposite flat sides, reducing the open end portion of the shell and threading the inside and the outside of said reduced end portion, and drilling out the head end of the stem to complete the opening therethrough.

2. The herein described method of forming valve-stems from sheet metal shells which consists in reducing the diameter of the closed end portion of the shell, forming a head and neck of said reduced end portion, forming opposite flat sides, reducing the open end portion to form a valve seat and chamber, and finally in drilling out the closed head portion to complete the passage through the stem.

3. The herein described method of forming valve-stems from sheet metal shells which consists in reducing the diameter and elongating a portion of the shell, forming a head on the said reduced portion of the shell, then drawing opposite flat sides on the body of the stem and swedging the opposite end portion of the shell and threading the inside and the outside of said reduced end portion.

4. The herein described method of forming a valve-stem from a sheet metal shell which consists in reducing the diameter of the closed end portion of the shell, next upsetting a part only of said reduced end to form a head and neck, then drawing opposite flat side portions on the body of the shell, forming a valve seat and chamber in the open end portion of the shell, and drilling out the closed head portion to complete a passage through the stem.

5. The herein described method of forming valve-stems from sheet metal shells which consists in reducing and elongating a portion of the shell, and in forming an internal annular shoulder therein, forming a head on one end portion of said shell, and reaming a hole in said head portion, forming a valve seat and chamber in the open end portion of the shell, and drilling out the closed head portion to complete a passage through the stem.

6. The herein described method of forming valve-stems from sheet metal shells which consists in reducing and elongating a portion of the shell, and in forming an internal annular shoulder therein, a valve support seated on the shoulder, forming a head and neck of one end portion of the shell, and in reaming a hole therethrough, and reducing the open end portion to form a valve seat and chamber, and in flattening the opposite sides of the body of the shell, and in threading the remaining cylindrical surface of the body.

7. The herein described method of forming valve stems from a hollow drawn metal body, which consists in reducing a portion of the body, in further reducing an end portion of said body to provide the neck of the stem, in then shaping a portion of said body to provide the head of the stem, and reducing the opposite end of said body and threading the inside and outside of said last mentioned reduced portion.

8. The method of forming valve stems from a hollow drawn metal body, which consists in reducing the diameter of a portion of the body, and shaping a portion extending from a point spaced from the shoulder formed by said reduced portion to the extremity of the body to form the head of the stem, the reduced portion between the head and said shoulder forming a neck.

9. The method of forming valve stems from a hollow drawn metal body of uniform diameter, and closed at one end, which consists in shaping the closed end of the body to provide the head of the stem, and forming an aperture through said head.

10. The method of forming valve stems from a hollow drawn metal body of uniform diameter, which consists in reducing one end portion of the body, and in shaping said reduced portion to provide the head of the stem.

Signed at Bridgeport, in the county of Fairfield and State of Connecticut this 22nd day of August A. D., 1921.

ALEXANDER W. LIMONT

Witnesses:
LILLIAN N. ALLING,
C. M. NEWMAN.